(12) United States Patent
Axelrod et al.

(10) Patent No.: US 8,807,088 B2
(45) Date of Patent: Aug. 19, 2014

(54) DISPENSING TOY FOR ANIMALS

(75) Inventors: Glen S. Axelrod, Colts Neck, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 205 days.

(21) Appl. No.: 13/341,761

(22) Filed: Dec. 30, 2011

(65) Prior Publication Data
US 2013/0167780 A1   Jul. 4, 2013

(51) Int. Cl.
*A01K 29/00* (2006.01)
*B65D 88/54* (2006.01)

(52) U.S. Cl.
USPC ........ 119/710; 119/709; 119/51.03; 222/537; 222/322

(58) Field of Classification Search
USPC ........ 119/707–711, 51.03, 51.5, 71, 72, 72.5, 119/51.01; 222/463, 526, 537, 322, 336, 222/372, 383.2, 383.1
See application file for complete search history.

(56) References Cited

U.S. PATENT DOCUMENTS

| | | | | |
|---|---|---|---|---|
| 1,334,769 A * | 3/1920 | McClain | ........................ | 222/340 |
| 2,913,153 A * | 11/1959 | Hester, Jr. | ........................ | 222/463 |
| 3,072,299 A * | 1/1963 | Sessions et al. | ............... | 222/246 |
| 5,301,836 A | 4/1994 | Luu | | |
| 5,881,927 A | 3/1999 | Inagawa | | |
| 5,992,698 A | 11/1999 | Copeland et al. | | |
| 6,142,100 A | 11/2000 | Marchioro | | |
| 6,186,096 B1 | 2/2001 | Miller | | |
| 6,202,598 B1 | 3/2001 | Willinger | | |
| 8,337,935 B2 * | 12/2012 | Chong | ........................ | 426/645 |
| 8,464,660 B2 * | 6/2013 | Valeriano | ........................ | 119/72 |
| 2007/0257060 A1 | 11/2007 | Young et al. | | |
| 2011/0088628 A1 * | 4/2011 | Valeriano | ........................ | 119/75 |
| 2011/0139815 A1 | 6/2011 | Benson | | |

FOREIGN PATENT DOCUMENTS

WO    02/49490    6/2002

OTHER PUBLICATIONS

International Search Report and Written Opinion from corresponding PCT Application No. PCT/US2012/071949 dated Mar. 4, 2013.

* cited by examiner

*Primary Examiner* — Kristen C Hayes
(74) *Attorney, Agent, or Firm* — Grossman, Tucker, Perreault & Pfleger, PLLC (57) ABSTRACT

A dispensing toy for an animal. The dispensing toy may include a dispensing pump and a reservoir. The dispensing pump may include a liquid container having a wall and a first opening defined therein. The dispensing pump may also include an actuator having a first end and a second end, wherein the first end of the actuator is received in the first liquid container opening and the second end of the actuator includes a configuration to be engaged by an animal. The dispensing pump may also include a bore extending from the first end to the second end of the actuator, a gasket coupled to the actuator wherein the gasket exhibits an interference fit with said liquid container wall, and a locking feature affixed to the first end of the actuator.

30 Claims, 10 Drawing Sheets

DISPENSING TOY FOR ANIMALS

FIELD OF THE INVENTION

The present invention relates to dispensing toys for animals and, in particular, for dogs or cats.

BACKGROUND

Numerous animal toys and pet chews have been developed to satisfy an animal's, and in particular a dog's or cat's, natural desire to bite, gnaw and otherwise chew upon objects, particularly items which may spur their natural instincts, such as natural bones. These chews are developed with the aim to avert an animal's attention from chewing other household items, such as furniture, shoes, hats and other household items causing unwanted damage thereto.

Attempts have been made at creating toys that attract pets, such as providing toys in the shape of animal bones, generally having a larger end and smaller shaft to allow the dog to more easily pick them up. Also, in this manner, a dog may hold the bone between their paws in order to chew it, thus providing a means for easy access to maintain interest. Another means to make a toy more attractive to a pet may be to include attractants such as flavorants, olfactory stimulants or audible stimulants.

Another purpose of animal toys has been to provide a surface upon which the animal's teeth may be scraped. Pets, such as dogs and cats, are subject to dental health problems. These problems may be traced to the formation of bacterial plaque that forms on the exterior of teeth. Tartar is the result of the thickening and hardening (mineralization) of the plaque. Dental prophylaxis is promoted in pets, and especially dogs, by the scraping of surfaces against the pet's teeth.

A further purpose of animal toys has been to provide exercise for the animals by encouraging play. Certain pets, due to a sedentary lifestyle, may gain weight or suffer from other health problems. Consequently, play is encouraged in pets to reduce the likelihood of such health issues.

While the above certainly contribute to the art of providing chew toys, there is still a need for improvement. It is an object of the present invention to improve upon the art of chew toys by providing a relatively flexible chew toy that provides noise in conjunction with articulation, and which may promote dental prophylaxis and which may encourage play.

SUMMARY OF THE INVENTION

An aspect of the present disclosure relates to a dispensing toy for an animal, such as a dog. The dispensing toy may include a dispensing pump and a reservoir. The dispensing pump may include a liquid container having a wall and a first opening defined therein. The dispensing pump may also include an actuator having a first end and a second end, wherein the first end of the actuator is received in the first liquid container opening and the second end of the actuator includes a configuration to be engaged by an animal. The dispensing pump may also include a bore extending from the first end to the second end of the actuator, a gasket coupled to the actuator wherein the gasket exhibits an interference fit with said liquid container wall, and a locking feature affixed to the first end of the actuator. The reservoir may have a first opening defined therein for receiving the liquid container. In addition, a cap may be provided coupling the dispensing pump to the reservoir including an opening defined therein for receiving the actuator, wherein the locking feature and the liquid container are retained in the liquid container by the cap.

A further aspect of the present disclosure relates to a dispensing toy, as described above, including a first one-way valve in fluid communication with said second liquid container opening and a second one-way valve in fluid communication with said bore.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure relates to a dispensing toy for animals and, in particular, a dispensing toy for animals such as dogs or cats. The dispensing toy may be utilized to provide liquid material of varying viscosity to the animal upon manipulation of the toy. The dispensing toy may incorporate a dispensing pump to provide the liquid from a reservoir.

Figure 1:
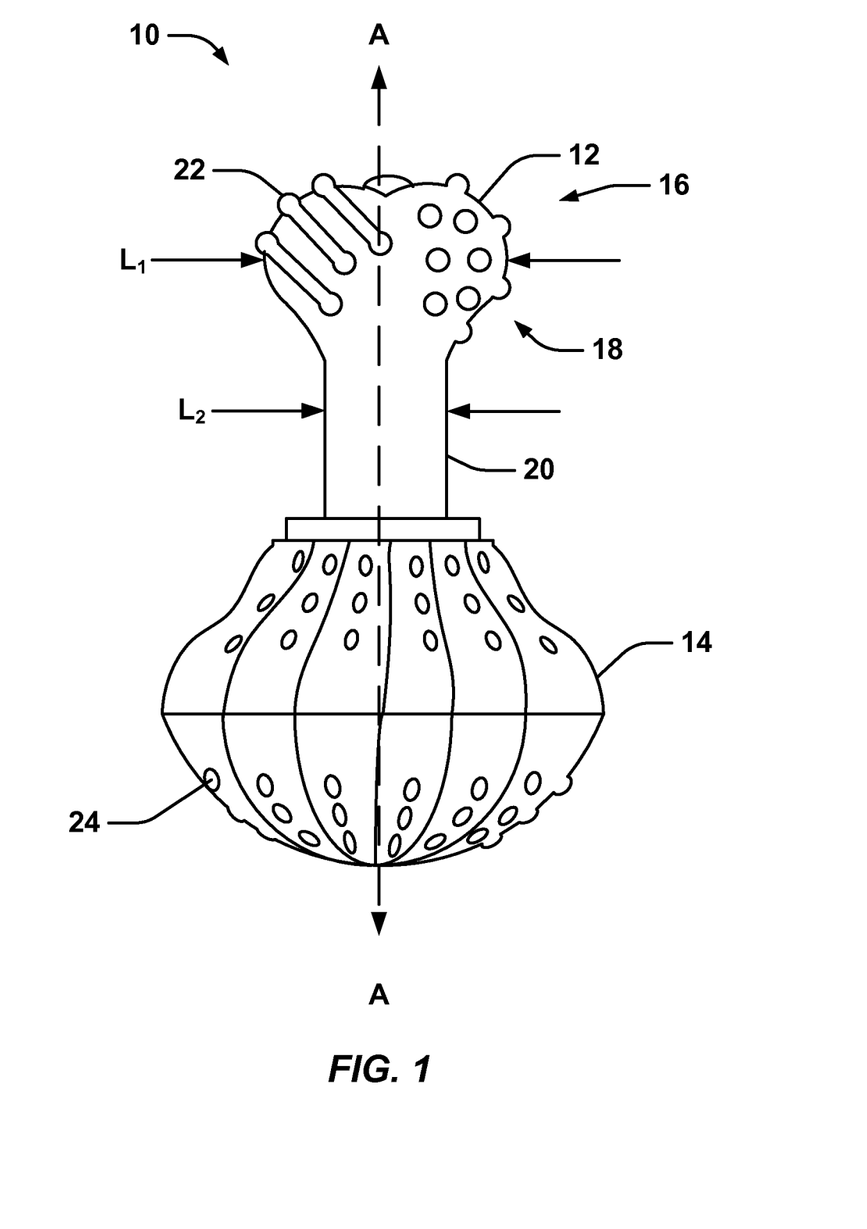
FIG. 1 illustrates a front view of a dispensing toy.

An embodiment of the dispensing toy is illustrated in FIG. 1. As seen in the figure, the dispensing toy 10 may include an actuator 12 for the dispensing pump (described further herein) and a reservoir 14. The actuator may be configured and size for ease of manipulation by an animal, such as a dog. Thus, one end of the actuator 12 may include a bulbous portion 18 that exhibits at least one cross-sectional dimension $L_1$ that is greater than a second cross-sectional dimension $L_2$ of the actuator shaft 20 located between the first end 15 of the actuator and the second end 16 of the actuator. In some embodiments, $L_1$ is equal the product of X and $L_2$, or $X*(L_2)$, wherein X is in the range of 1.2 to 2. The bulbous portion may, therefore, be sized such that it can be engaged by an animal. For example, it may be configured such that a dog can fit the bulbous portion within their mouth.

The end 16 of the actuator 12 may also include a number of raised projections 22 of one or more configurations (two configurations are illustrated) that may engage the teeth or paw of an animal. Similarly, the reservoir may also include a number of raised projections 24 that may engage the teeth or paw of an animal. Engagement of the raised projections 22, 24 may improve manipulation of the toy by the animal, reducing slippage of the device as the animal is trying to manipulate the toy. The raised projections may have one or more dimensions of width, length, or height selected from the range of 1 mm to 1 cm, including all values and ranges therein.

Figure 2:
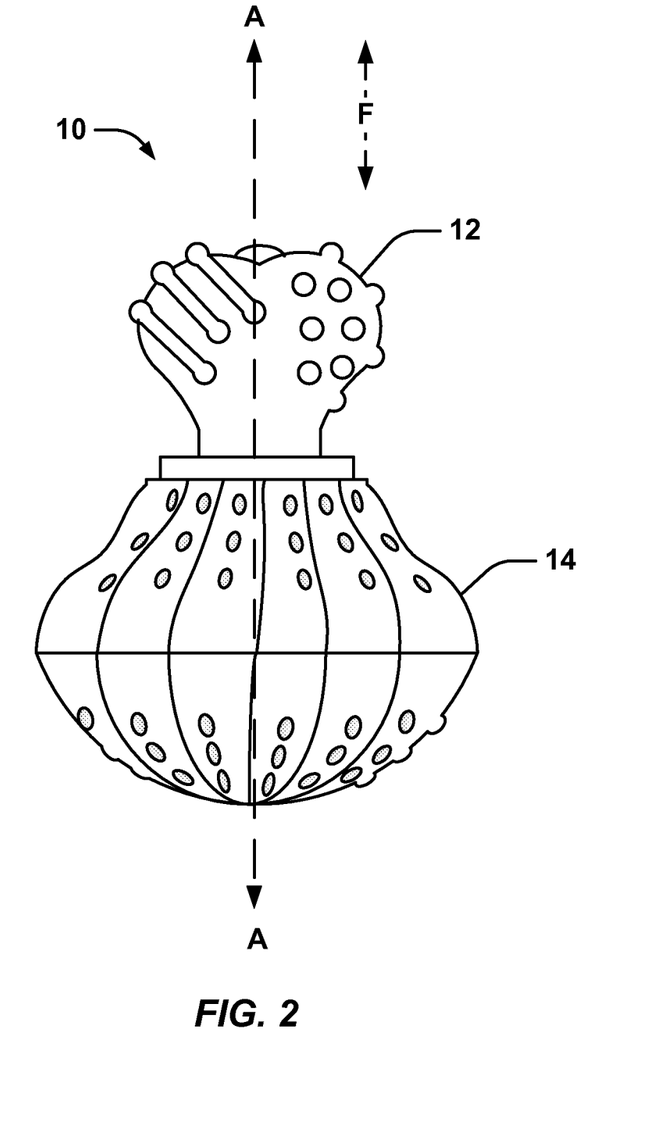
FIG. 2 illustrates a front view of the dispensing toy of FIG. 1, wherein the actuator has been driven into the reservoir.
Figure 3:
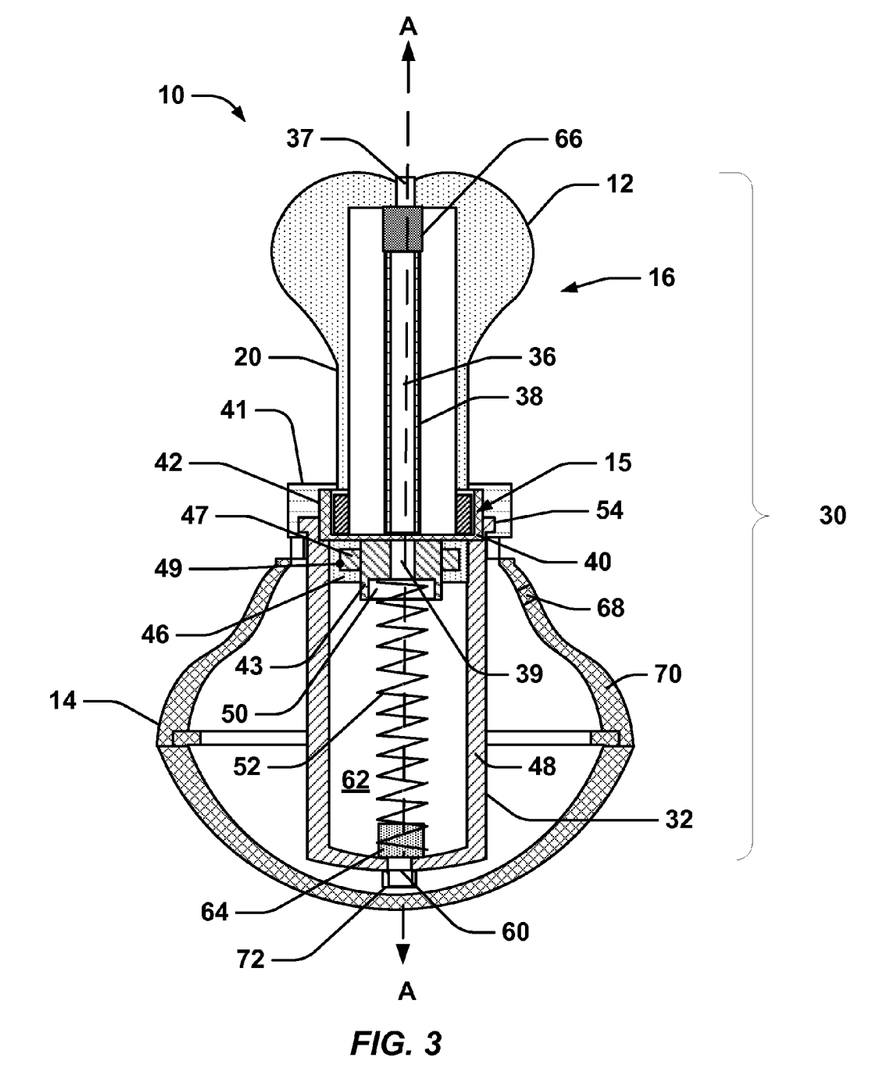
FIG. 3 illustrates a cross-sectional view of the dispensing toy of FIG. 1 as viewed from the front.
Figure 4:
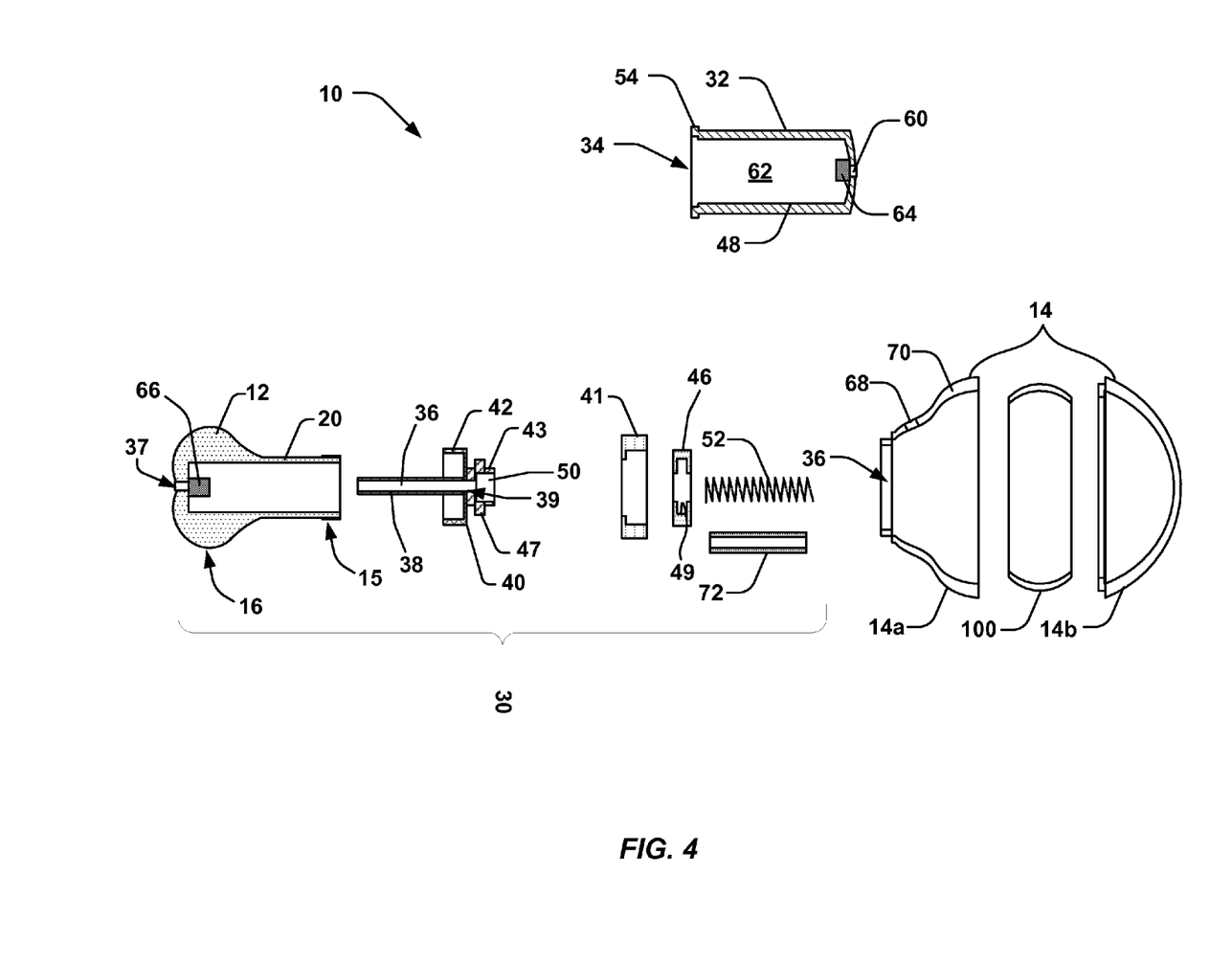
FIG. 4 illustrates an exploded cross-sectional view of the dispensing toy of FIG. 3.

FIGS. 2, 3 and 4 illustrate an embodiment of the dispensing toy, wherein the dispensing toy may include a dispensing pump 30 (see FIGS. 3 and 4) that is actuated by applying a linear force F against the actuator 12 along axis A-A. Thus, the actuator 12 may generally be driven into (as illustrated in FIG. 2) and drawn up from a liquid container 32 positioned (as illustrated in FIG. 1), at least partially or completely, within the reservoir 14. The liquid composition may be dispensed from the liquid container 32 through either or both actions (i.e., driving the actuator into the reservoir or drawing the actuator up from the reservoir). Therefore, fluid communication of the liquid composition may be provided from the liquid container into and out of the actuator and, optionally, into the liquid container from the reservoir.

As alluded to above, the actuator may have a first end 15 and a second end 16, (for purposes of illustration, the second end may be understood as including the bulbous portion). The first end 15 of the actuator 12 may, therefore, be received within an opening 34 of the liquid container 32. The actuator 12 may include a bore 36 extending through the actuator 12 from the first end 15 through the second end 16 through which the liquid composition may travel during dispensing. An opening 37 may be defined in the second end of the actuator to allow the liquid composition to flow out of the dispensing toy 10 and, preferably, into the mouth of the animal manipulating the toy.

As illustrated, the bore 36 is defined in a tube 38 received in or coupled to the actuator 12. Thus, at least a portion of the actuator 12 may define a hollow space. This hollow space may provide thinner wall sections to assist in molding of the actuator. However, it may be appreciated that the bore 36 may be located and defined by the actuator 12, itself.

A locking feature 40 may be provided at the first end of the actuator 12. The bore 36 may, therefore, extend through the locking feature 40, wherein an opening 39 is defined to provide fluid communication between the liquid container 32 into the actuator 12. The locking feature 40 may include a shoulder 42, which may interact with a cap 41 that mates with the reservoir 14 via coupling features, such as mating mechanical fasteners. By mating the cap 41 with the reservoir 14, the liquid container 32 is retained relative to the reservoir 14 and at least the first end 15 of the actuator 12 may be retained within the liquid container 32.

The locking feature 40 may be separable from or formed unitarily with the actuator 12. If unitarily formed with the actuator 12, the locking feature 40 and actuator 12 are one piece. If separable from the actuator 12, the locking feature 40 may mate or be coupled with the first end of the actuator 12 with coupling features, such as a mechanical fastener. In one example, as illustrated, the actuator 12 and shoulder 42 may include mating threads. In another example, the actuator 12 and shoulder 42 may form a snap-fit or press-fit assembly. In addition, the tube 38 may be formed unitary with the locking feature 40 or may be coupled to the locking feature.

At the base of the locking feature 40, on the surface opposing the actuator 12, a raised collar 43 may be provided. A gasket 46 may be provided around the collar 43 and may be retained on the collar 43 mechanically, chemically or both. For example, a ledge 47 may extend from the collar 43, which may be received by the internal surface 49 of the gasket 46. An adhesive may also be provided chemically bonding the gasket 46 to the collar 43. In addition to being coupled indirectly to the actuator 12, as described above, the gasket 46 may also be coupled directly to the actuator 12. For example, if the locking feature 40 is integral with the actuator 12, the gasket may be coupled directly to the surfaces of the actuator, locking feature or both. In addition, the gasket may be coupled to the actuator shaft 20 above the locking feature 40 relative to the liquid container 32. The gasket 46 may provide a seal preventing the liquid composition from flowing out of the liquid container 32 through the opening 34 outside of fluid communication provided by the bore 38. The gasket 46 may be formed of a thermoplastic elastomer or rubber.

In addition, the gasket 46 may exhibit an interference fit with the wall 48 of the liquid container 32. That is, the gasket 46 may have the same, or slightly greater, outer cross-sectional dimensions as the inner cross-sectional dimensions of the liquid container 32. In some embodiments, the gasket 46 and liquid container 32 may be circular in cross-section and in other embodiments, the gasket 46 and liquid container 32 may be non-circular in cross-section.

The collar 43 may also include recess 50 defined therein for received a resilient member 52. The resilient member 52 may include, for example, a coil or helical spring, which biases the locking feature 40 against the cap 41. When a force is applied to the actuator 12 in a downward direction, pushing the first end 15 of the actuator 12 into the liquid container 32, the resilient member 52 may be compressed. Thus, when the force F is released from the actuator 12, the resilient member 52 may extend the actuator 12 out from the liquid container 32.

Referring again to the liquid container, the liquid container 32 may include a lip 54 for suspending the liquid container 32 with an opening 36 defined in the upper portion 38 of the reservoir 14 (see FIG. 4). While not illustrated, a mechanical fastener, or other device, may be provided to couple the liquid container 32 to the reservoir 14. For example, mating threads provided on both the liquid container 32 and reservoir 14. Or, in another non-limiting example, a key and a keyway may be provided on the liquid container 32 and reservoir 14 to couple the liquid container to the reservoir in a non-rotating manner, i.e., preventing rotation between the reservoir and liquid container. Furthermore, the cross-sections of the liquid container 32 and reservoir 14 may be non-circular, limiting rotation the liquid container relative to the reservoir 14.

Optionally, a second opening 60 may be provided in the liquid container 32 for providing fluid communication between the reservoir 14 and interior 62 of the liquid container 32. A one-way valve 64, such as a ball-check valve or duckbill valve may be associated with the second opening 60, such as being provided at the opening or in fluid communication with the opening 60. The valve 64 may allow the liquid composition to be drawn from the reservoir 14 into the liquid container 32 when the actuator 12 is withdrawn from the liquid container 32. A second one-way valve 66 may also be associated with, or provided in fluid communication with, the bore 36. While it is illustrated that the second one-way valve is provided at the second end 16 of the actuator 12 at the opening 37, the second one-way valve may be positioned anywhere along the length of bore 36, such as at opening 39. Further, a vent 68 may be provided in the wall 70 reservoir 14 to provide air into the reservoir 14 as the liquid composition is being drawn out of the reservoir 14. Again, the vent may be a one-way valve allowing air to flow into the reservoir 14, but does not allow air or the liquid composition to escape from the reservoir 14. In other embodiments, rather than providing a vent, a collapsible bag may be provided in the reservoir holding the liquid composition. As the liquid composition is removed from the bag and into the liquid container, the bag may collapse.

A method of using the dispenser may include filling the liquid container, the reservoir, or both with the liquid composition to be dispensed. A downward force may be applied to the actuator, such as through the chewing action of a dog, and the actuator 12 may be forced into the liquid container 32. Travel of the actuator 12 into the liquid container 32 may displace liquid composition from the liquid container 32 into the bore 36. In addition, force from displacement of the liquid composition may open the one-way valve 66 associated with bore 36 allowing the liquid composition to flow of the opening 37 in the second end of the actuator 12 for consumption by the animal.

Upon drawing the actuator 12 out of the liquid container 32, the one way valve associate with the bore 36 may close prevent air from flowing back into the liquid container 32. This may create a vacuum, or force, against the first one-way valve 64 associated with the second opening 62 in the liquid container 32, opening the valve and drawing the liquid composition from the reservoir 14 into the liquid container 32, recharging the liquid container 32 with the liquid composition. The vent 68 may allow air to enter the reservoir 14 as the liquid composition is withdrawn into the liquid container 32.

To aid in the removal of the liquid composition from the reservoir 14 into the liquid container 32, the reservoir 14 may be weighted, such that the animal toy may be self-righting. Stated another way, the animal toy 10 may be able to maintain a relatively upright position, particularly, when the actuator 12 is being withdrawn from the liquid container 32.

Figure 5:
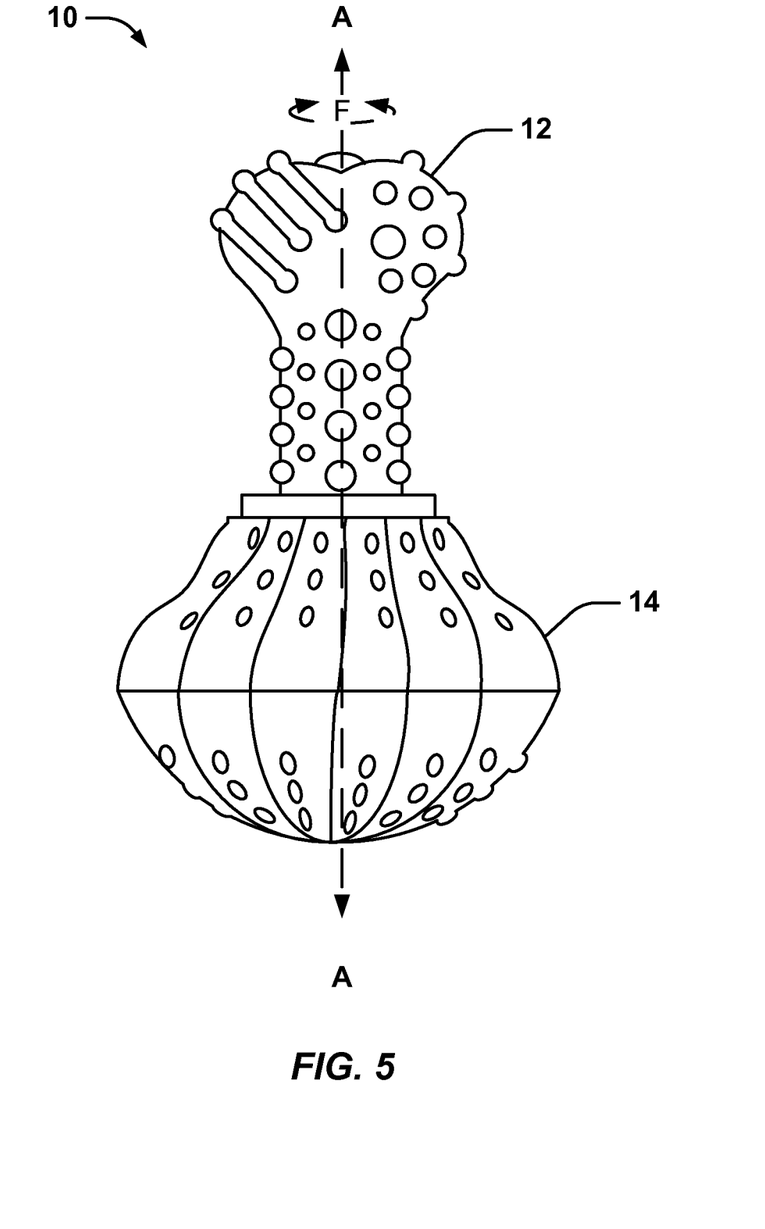
FIG. 5 illustrates a front view of a dispensing toy.
Figure 6:
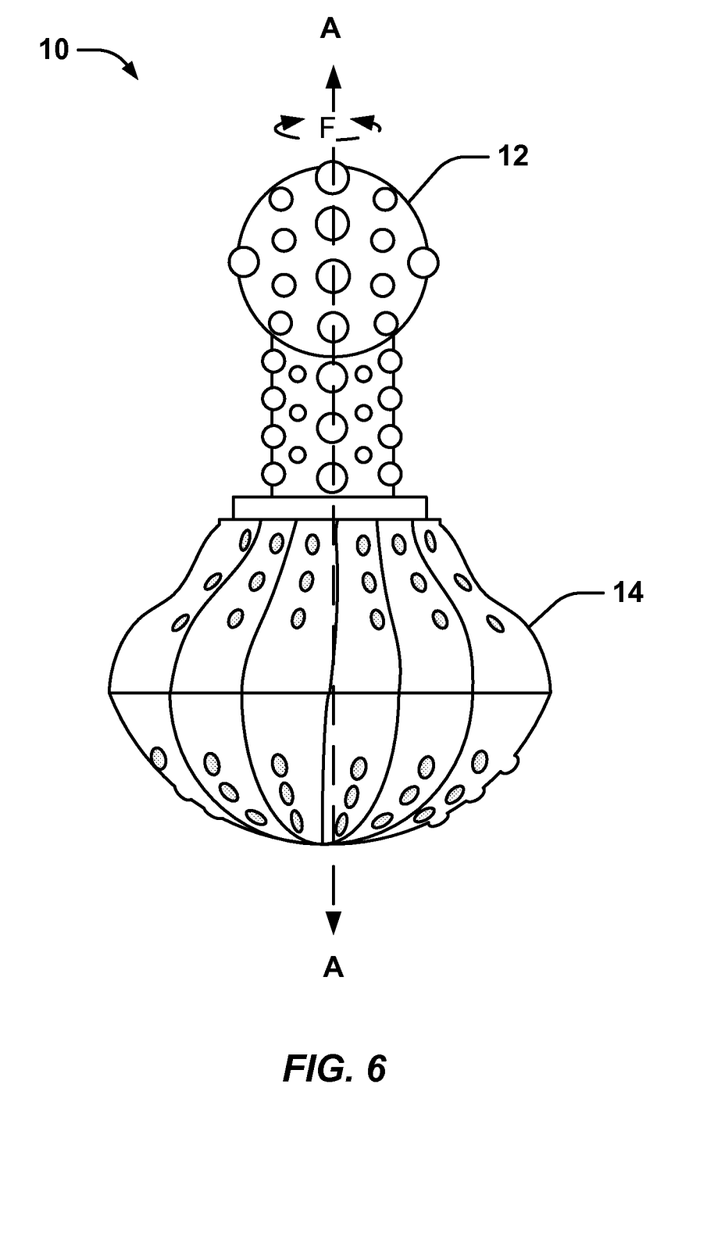
FIG. 6 illustrates a front view of the dispensing toy of FIG. 5, wherein the actuator has been rotated about axis A-A.

FIGS. 5, 6, 7, 8, and 9 illustrate another embodiment of the dispensing toy 10, wherein the dispensing toy may include a dispensing pump 30 (see FIGS. 7 and 9) that is actuated by applying a rotational force F against the actuator 12 as illustrated in FIG. 5. FIG. 6 illustrates rotation of the actuator 12 approximately 90 degrees in either direction around axis A-A running from the top to the bottom of the dispensing toy 10. Thus, the actuator 12 may generally be rotated within the liquid container 32 to dispense the liquid composition from the liquid container 32. Again, fluid communication may be established from the liquid container into and out of the actuator and, optionally, into the liquid container from the reservoir.

Similar to the embodiment described above, actuator 12 may have a first end 15 and a second end 16, (for purposes of illustration, the second end may be understood as including the bulbous portion). The first end 15 of the actuator 12 may, therefore, be received within an opening 34 (see FIG. 9) of the liquid container 32. The actuator 12 may include a bore 36 extending through the actuator 12 from the first end 15 through the second end 16 through which the liquid composition may travel during dispensing. An opening 37 may be defined in the second end of the actuator to allow the liquid composition to flow out of the dispensing toy 10 and, preferably, into the mouth of the animal manipulating the toy.

Figure 7:
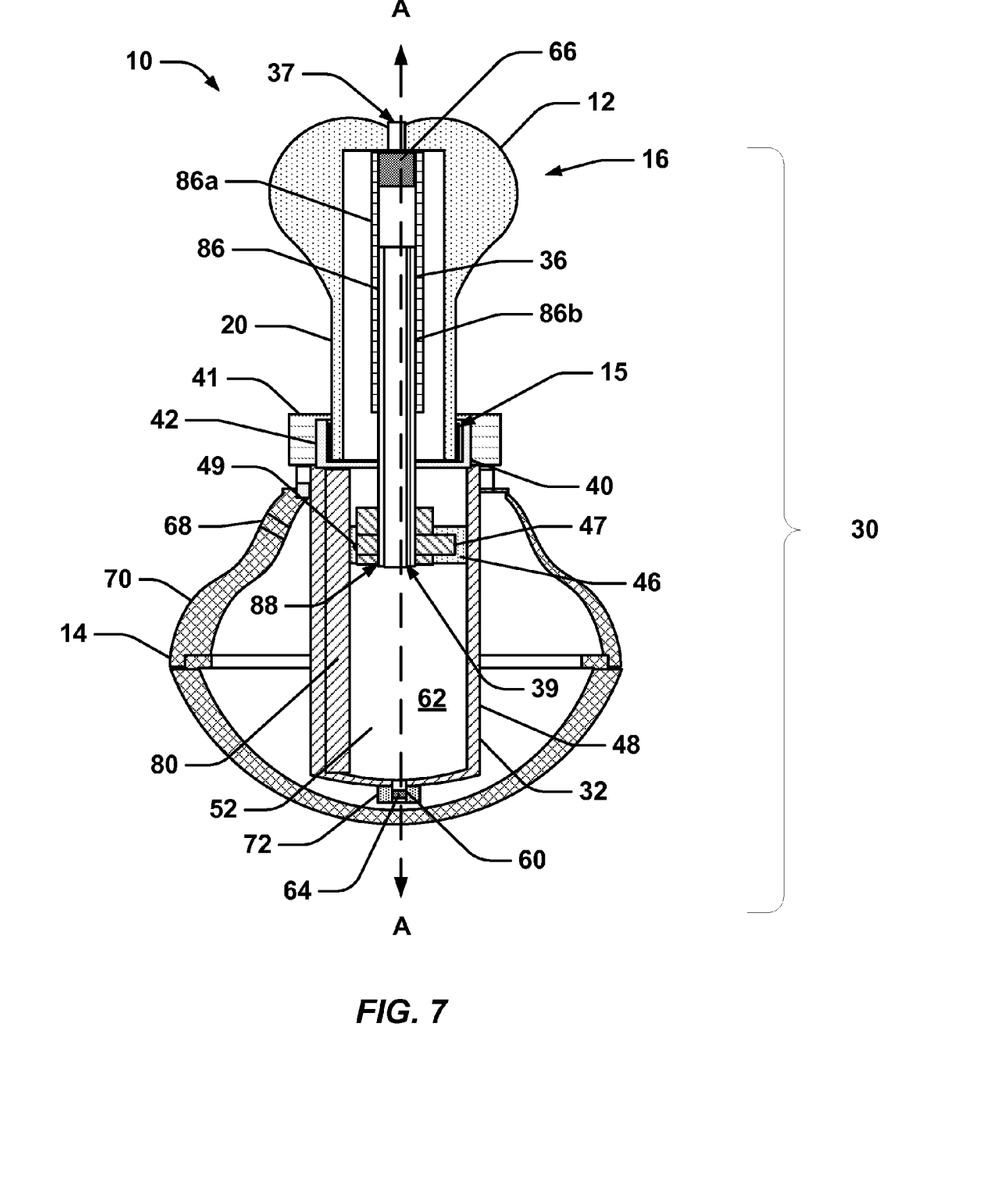
FIG. 7 illustrates a cross-sectional view of the dispensing toy of FIG. 5 as viewed from the front.
Figure 9:
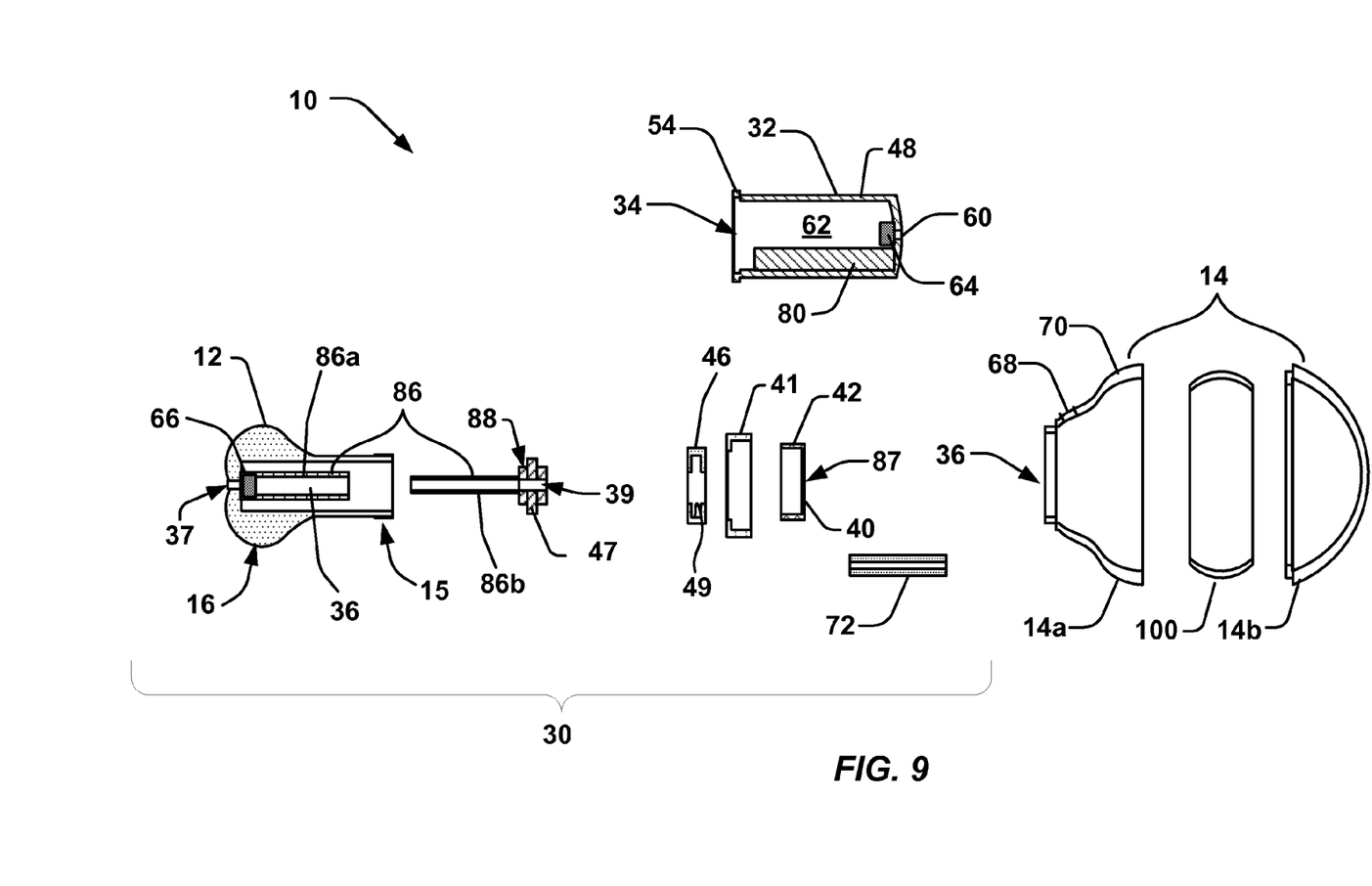
FIG. 9 illustrates an exploded view of the cross-sectional view of FIG. 7.

Again, a locking feature 40 may be provided at the first end of the actuator 12. The locking feature 40 may include a shoulder 42, which may interact with a cap 41 that mates with the reservoir 14 via coupling features, such as mechanical fasteners including mating threads, press-fits or snap-fits. By mating the cap 41 with the reservoir 14, the liquid container 32 is retained relative to the reservoir 14 and at least the first end 15 of the actuator 12 may be retained within the liquid container 32.

Further, similar to the embodiment described above, the locking feature 40 may be separable from or formed unitarily with the actuator 12. If unitarily formed with the actuator 12, the locking feature 40 and actuator 12 are one piece. If separable from the actuator 12, the locking feature 40 may mate or be coupled with the first end of the actuator 12 with coupling features, such as mechanical fastener. In one example, as illustrated, the actuator 12 and shoulder 42 may include mating threads. In another example, the actuator 12 and shoulder 42 may form a snap-fit or press-fit assembly.

Figure 8:
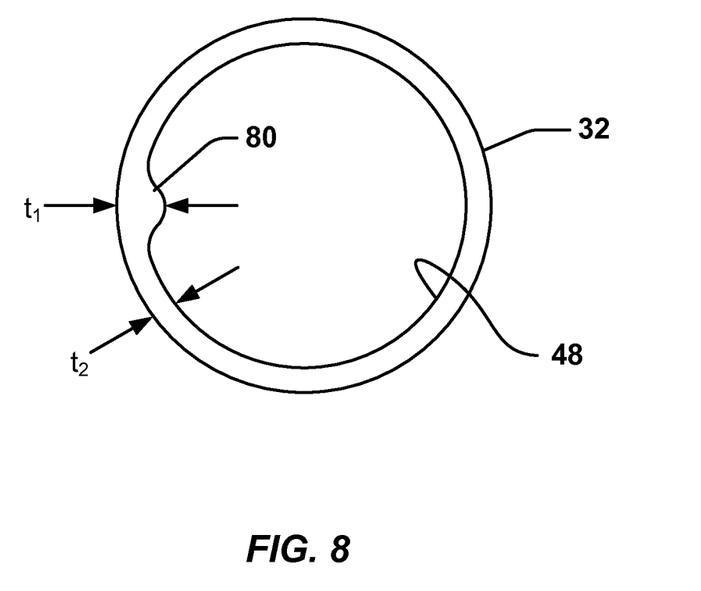
FIG. 8 illustrates a cross-sectional view of a liquid container as viewed from the top.

As illustrated in FIGS. 7, 8 and 9, the liquid container 32 may include a raised feature 80 running along a portion of the length of the wall 48 to the base 82 of the liquid container 32. The raised feature 80 may include a portion of a wall that exhibits a greater thickness $t_1$ than the thickness $t_2$ of remainder of the wall of the liquid container, wherein $t_1 > t_2$. The change in thickness may be gradual or abrupt. The locking feature 40 may sit or rest on top of the raised feature 80, such that the locking feature 40 may then be retained linearly between the cap and the raised feature 80 preventing motion of the actuator 12 into and out of the liquid container 32.

As illustrated, the bore 36 through which the liquid composition is communicated may be defined in tube 86. The tube 86 may include a first portion 86a and a second portion 86b, wherein the portion may rotate and move telescopically relative to each other. The first portion of the tube 86a may be coupled to the second end 16 of the actuator 12. The second portion 86b may pass through an opening 87 provided in the locking feature 40 and is maintained in a non-rotating manner relative to the liquid container 32 by a gasket 46. The gasket 46 may exhibit an interference fit with the wall 48 of the liquid container 32. That is, the gasket 46 may have the same, or slightly greater, outer cross-sectional dimensions as the inner cross-sectional dimensions of the liquid container 32. Furthermore, the gasket may include a depression, which corresponds to the raised feature of the liquid container 32, thus preventing rotation of the second tube portion 86b relative to the liquid container 32.

Mating threads may be provided on corresponding surfaces of the tubes, such as the internal surface of the first portion of the tube 86a or the external surface of the second portion of the tube 86b (or vice versa) to facilitate the telescopic motion of the tubes relative to each other. As tube 86a coupled to the actuator 12 rotates, the second portion of the tube 86b is driven up and down within the liquid container 32 along axis A-A The gasket 46 may be provided around the base 88 of the second tube 86b and may be retained on the tube 86b mechanically, chemically or both. For example, a ledge 47 may extend from the tube 86b, which may be received by the internal surface 49 of the gasket 46. An adhesive may also be provided chemically bonding the gasket 46 to the tube 86b. An opening 39 is defined at the base of the tube 86b to provide fluid communication between the liquid container 32 into the actuator 12. The gasket 46 may provide a seal preventing the liquid composition from flowing out of the liquid container 32 through the opening 34 outside of fluid communication provided by the bore 36. The gasket 46 may be formed of a thermoplastic elastomer or rubber.

Referring again to the liquid container, the liquid container 32 may include a lip 54 (see FIG. 9) for suspending the liquid container 32 with an opening 36 defined in the upper portion 38 of the reservoir 14. The lip 54 of the liquid container 32 may extend past the reservoir opening and rest on the reservoir 14. While not illustrated, a mechanical fastener, or other device, may be provided to couple the liquid container 32 to the reservoir 14. For example, mating threads provided on both the liquid container 32 and reservoir 14. Or, in another non-limiting example, a key and a keyway may be provided on the liquid container 32 and reservoir 14 to couple the liquid container to the reservoir in a non-rotating manner, i.e., preventing rotation between the reservoir and liquid container. Furthermore, the cross-sections of the liquid container 32 and reservoir 14 may be non-circular, limiting rotation the liquid container relative to the reservoir 14.

Again, optionally, a second opening 60 may be provided in the liquid container 32 for providing fluid communication between the reservoir 14 and interior 62 of the liquid container 32. A one-way valve 64, such as a ball-check valve or duckbill valve, may be provided in association with or in fluid communication with the opening 60. The one-way valve 64 may allow the liquid composition to be drawn from the reservoir 14 into the liquid container 32 when the actuator 12 is withdrawn from the liquid container 32 by rotating the actuator in the opposite direction. A second one-way valve 66 may also be provided in the bore 36. While it is illustrated that the second one-way valve is provided at the second end 16 of the actuator 12 at the opening 37, the second one-way valve may be positioned anywhere along the length of bore 36, such as at opening 39. Further, a vent 68 may be provided in the wall 70 reservoir 14 to provide air into the reservoir 14 as the liquid composition is being drawn out of the reservoir 14. Again, the vent may be a one-way valve allowing air to flow into the reservoir 14, but does not allow air or the liquid composition to escape from the reservoir 14. A flexible tube 72 may also be provided that may be coupled to the second opening 60 of the liquid container 32.

A method of using the dispenser may include filling the liquid container, the reservoir, or both with the liquid composition to be dispensed. A rotational force may be applied to the actuator, such as through the chewing action of a dog, and the second tube portion 86b may be forced into the liquid container 32. Travel of the second tube portion 86b into the liquid container 32 may displace liquid composition from the liquid container 32 into the bore 36. In addition, force from displacement of the liquid composition may open the one-way valve 66 associated with bore 36 allowing the liquid composition to flow of the opening 37 in the second end of the actuator 12 for consumption by the animal.

Upon rotation of the actuator 12 in the opposite direction, the second tube portion may be withdrawn from the liquid container 32 and the one way valve associate with the bore 36 may close prevent air from flowing back into the liquid container 32. This may create a vacuum, or force, against the first one-way valve 64 associated with the second opening 62 in the liquid container 32. The force may open the valve 64 and draw the liquid composition from the reservoir 14 into the liquid container 32, recharging the liquid container 32 with the liquid composition. The vent 68 may allow air to enter the reservoir 14 as the liquid composition is withdrawn into the liquid container 32.

Similar to the above embodiment, to aid in the removal of the liquid composition from the reservoir 14 into the liquid container 32, the reservoir 14 may also have a base that is weighted, such that the animal toy may be self-righting. Stated another way, the animal toy 10 may be able to maintain a relatively upright position, particularly, when the actuator 12 is being withdrawn from the liquid container 32.

The actuator, reservoir, and other components of the dispensing toy, and particularly those that may be chewed or pawed by an animal, may be formed of one or more thermoplastic and/or thermoset resins. Non-limiting examples of the resin may include nylon, polyurethane, rubber, etc. The resin may exhibit a Shore A durometer of 20 or greater, including all values and ranges therein up to 100, such as 80, 90, etc. The resin may also exhibit a flexural modulus of 100,000 psi or greater, including all values and ranges therein, and a tensile strength of 10,000 psi or greater, including all values and ranges therein.

In some embodiments, a second resin may be incorporated into the surfaces exhibiting different properties than the first resin described above. For example, at least a portion of, or all of, the raised projections may be formed from a second resin. The second resin may exhibit a lower Shore A durometer, lower flexural modulus, lower tensile strength, or a combination thereof than the first resin. For example, the second resin may have a Shore A durometer of at least 10 units less than that of the first resin. The second resin may be provided by over-molding the first resin, or second resin.

For example, as illustrated in FIGS. 4 and 9, the reservoir 14 may include a first portion 14a and a second portion 14b. A thermoplastic elastomer insert 100 may be provided, which is received between the first and second portions 14a, 14b of the reservoir 14. The insert 100 may provide a seal as between the two reservoir halves.

Figure 10:
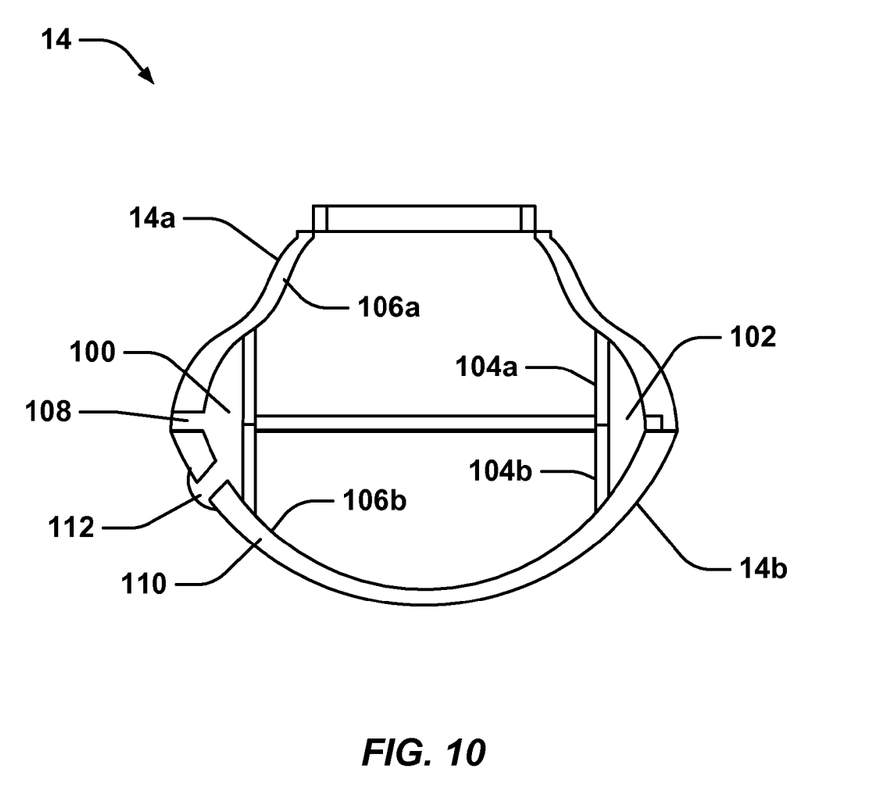
FIG. 10 illustrates a cross-sectional view of a reservoir viewed from the front.

In one embodiment, the reservoir 14 may include a channel 102, as illustrated in FIG. 10. The channel 102 may be formed by channel walls 104a, 104b that may extend from the interior surface 106a, 106b of the reservoir halves 14a and 14b. An opening 108 may be provided in the wall 110 of the reservoir 14 to allow for the gasket to be molded into the channel 102 defined in the reservoir. Optionally, additional openings 112 may be provided in the reservoir wall 110 so that the insert material 100 may extend out of the reservoir forming one or more of the raised projections described above.

The liquid composition dispensed from the liquid container may have a viscosity in the range of 0.5 cP to 150,000 cP, including all values and ranges therein, such as 2,000 cP to 100,000 cP, 5,000 cP to 50,000 cP, etc. The liquid may be Newtonian or non-Newtonian. The liquid may include compositions that include mild abrasives and other additives, breath sweeteners or compounds that may be ingested for improving oral health. Abrasive additives may include calcium carbonate, talc, sodium bicarbonate, etc. The abrasive additive may exhibit a Mohs hardness of 4 or less, including all values and ranges therein such as 0.5 to 4. The abrasive additive may be present between about 5-10% by weight of the liquid composition. Breath sweetening agents may include mint, spearmint, peppermint or wintergreen and may also include parsley, chlorophyll, etc.

Other ingestible compounds for improving oral health may include, but are not limited to, alma, bilberry fruit, hawthorn berry, Echinacea, goldenseal, folic acid, olive leaf extract, aloe vera, cranberry, licorice root, spirulina, horsetail, coenzyme Q10, yellow dock root, alfalfa leaf, cinnamon bark and tumeric root. The compounds may also include Vitamin C alone or in combination with sodium hexametaphosphate. Breath sweetening and ingestible compounds may individually be present in the range of 0.01 to 5.0% by weight of the base composition, including all values and ranges therein at 0.01% increments. In addition, the total amount of breath sweetening or ingestible compounds may be present in the range of 0.01 to 25.0% by weight of the base composition.

Various additional additives may be added to the liquid composition including fiber, plasticizers, colorants, flavorants, olfactory stimulants, etc. In addition, nutrient sources, such as sources of micronutrients, macronutrients and other dietary supplements may be incorporated.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A dispensing toy, comprising:
   a dispensing pump including
   a liquid container having a wall and a first opening defined therein,
   an actuator having a first end and a second end, wherein said first end of said actuator is received in said first liquid container opening and said second end of said actuator includes a configuration to be engaged by an animal,
   a bore extending from said first end to said second end of said actuator,
   a gasket coupled to said actuator wherein said gasket exhibits an interference fit with said liquid container wall, and
   a locking feature affixed to said first end of said actuator;
   a reservoir, having a first opening defined therein for receiving said liquid container; and
   a cap coupling said dispensing pump to said reservoir including an opening defined therein for receiving said actuator, wherein said locking feature and said actuator are retained in said liquid container by said cap;
   wherein said dispensing pump further includes a tube received within said actuator, wherein said bore is defined within said tube;
   wherein said tube includes a first portion and a second portion, which are telescopically extendable relative to each other; and
   wherein said actuator rotates relative to said liquid container and said gasket is received in said liquid container in a non-rotatable manner, wherein upon rotation of said actuator, said tube extends or retracts and said gasket is displaced within said liquid container.

2. The dispensing toy of claim 1, wherein said dispensing toy is self-righting.

3. The dispensing toy of claim 1, wherein said actuator includes an actuator shaft between said first end and said second end of said actuator and said configuration to be engaged by an animal includes a bulbous portion, wherein said bulbous portion exhibits a first cross-sectional dimension $L_1$ that is greater than a second cross-section dimension of the actuator shaft $L_2$.

4. The dispensing toy of claim 3, wherein said bulbous portion and said reservoir include a plurality of raised features extending from the surfaces of said bulbous portion and said reservoir.

5. The dispensing toy of claim 1, further comprising a thermoplastic elastomer insert positioned within said reservoir, wherein portions of said elastomer protrude from openings defined in said reservoir surface, forming raised features.

6. The dispensing toy of claim 5, wherein said reservoir defines a channel therein and said thermoplastic elastomer is provided within said channel.

7. The dispensing toy of claim 1, wherein said locking feature is formed from a raised surface of said actuator and includes a shoulder, wherein said shoulder is retained in said liquid container by said cap.

8. The dispensing toy of claim 1, wherein said locking feature includes a first coupling feature and said actuator includes a second coupling feature which mates with said first coupling feature.

9. The dispensing toy of claim 1, wherein said reservoir comprises a vent including a one-way valve.

10. The dispensing toy of claim 1, wherein said gasket is affixed to said tube.

11. The dispensing toy of claim 1, wherein said liquid container wall includes a raised feature and said gasket includes a depression, wherein said raised feature and said depression mate in the non-rotating manner.

12. The dispensing toy of claim 1, wherein said liquid container includes a second opening defined in said liquid container wall, and said dispensing pump further includes a first one-way valve in fluid communication with said second liquid container opening and a second one-way valve in fluid communication with said bore.

13. The dispensing toy of claim 1, wherein said actuator is received in said liquid container in a sliding manner.

14. The dispensing toy of claim 1, further comprising a collapsible container received within said reservoir, wherein said liquid container is received in said collapsible container.

15. A dispensing toy, comprising:
    a dispensing pump including
    a liquid container having a wall and a first opening defined therein,
    an actuator having a first end and a second end, wherein said first end of said actuator is received in said first liquid container opening and said second end of said actuator includes a configuration to be engaged by an animal,
    a bore extending from said first end to said second end of said actuator, a gasket coupled to said actuator wherein said gasket exhibits an interference fit with said liquid container wall, and
    a locking feature affixed to said first end of said actuator;
    a reservoir, having a first opening defined therein for receiving said liquid container; and
    a cap coupling said dispensing pump to said reservoir including an opening defined therein for receiving said actuator, wherein said locking feature and said liquid container are retained in said liquid container by said cap; and
    wherein said dispensing pump further comprises a resilient member located within said liquid container biasing said locking feature against said cap.

16. The dispensing toy of claim 15, wherein said dispensing toy is self-righting.

17. The dispensing toy of claim 15, wherein said actuator includes an actuator shaft between said first end and said second end of said actuator and said configuration to be engaged by an animal includes a bulbous portion, wherein said bulbous portion exhibits a first cross-sectional dimension $L_1$ that is greater than a second cross-section dimension of the actuator shaft $L_2$.

18. The dispensing toy of claim 17, wherein said bulbous portion and said reservoir include a plurality of raised features extending from the surfaces of said bulbous portion and said reservoir.

19. The dispensing toy of claim 15, further comprising a thermoplastic elastomer insert positioned within said reservoir, wherein portions of said elastomer protrude from openings defined in said reservoir surface, forming raised features.

20. The dispensing toy of claim 19, wherein said reservoir defines a channel therein and said thermoplastic elastomer is provided within said channel.

21. The dispensing toy of claim 15, wherein said locking feature is formed from a raised surface of said actuator and includes a shoulder, wherein said shoulder is retained in said liquid container by said cap.

22. The dispensing toy of claim 15, wherein said locking feature includes a first coupling feature and said actuator includes a second coupling feature which mates with said first coupling feature.

23. The dispensing toy of claim 15, wherein said reservoir comprises a vent including a one-way valve.

24. The dispensing toy of claim 15, wherein said dispensing pump further includes a tube received within said actuator, wherein said bore is defined within said tube.

25. The dispensing toy of claim 24, wherein said gasket is affixed to said tube.

26. The dispensing toy of claim 15, wherein said liquid container includes a second opening defined in said liquid container wall, and said dispensing pump further includes a first one-way valve in fluid communication with said second liquid container opening and a second one-way valve in fluid communication with said bore.

27. The dispensing toy of claim 15, wherein said actuator is received in said liquid container in a sliding manner.

28. The dispensing toy of claim 15, wherein upon application of a force to said actuator compresses said resilient member and expels liquid from said liquid container.

29. The dispensing toy of claim 15, further comprising a collapsible container received within said reservoir, wherein said liquid container is received in said collapsible container.

30. A dispensing toy, comprising:
a dispensing pump including
a liquid container having a wall and a first opening defined therein,
an actuator having a first end and a second end, wherein said first end of said actuator is received in said first liquid container opening and said second end of said actuator includes a configuration to be engaged by an animal,
a bore extending from said first end to said second end of said actuator, a gasket coupled to said actuator wherein said gasket exhibits an interference fit with said liquid container wall, and
a locking feature affixed to said first end of said actuator;
a reservoir, having a first opening defined therein for receiving said liquid container;
a cap coupling said dispensing pump to said reservoir including an opening defined therein for receiving said actuator, wherein said locking feature and said liquid container are retained in said liquid container by said cap; and
a collapsible container received within said reservoir, wherein said liquid container is received in said collapsible container.

* * * * *